United States Patent
Konik et al.

(10) Patent No.: US 11,204,926 B2
(45) Date of Patent: Dec. 21, 2021

(54) STORING PARTIAL TUPLES FROM A STREAMING APPLICATION IN A DATABASE SYSTEM

(71) Applicant: International Business Machines Corporation, Armonk, NY (US)

(72) Inventors: Rafal P. Konik, Oronoco, MN (US); Jessica R. Eidem, Rochester, MN (US); Jingdong Sun, Rochester, MN (US); Roger A. Mittelstadt, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 16/177,260

(22) Filed: Oct. 31, 2018

(65) Prior Publication Data
US 2020/0134073 A1 Apr. 30, 2020

(51) Int. Cl.
| | | |
|---|---|---|
| G06F 17/30 | (2006.01) | |
| G06F 16/2455 | (2019.01) | |
| G06F 16/23 | (2019.01) | |
| G06F 16/25 | (2019.01) | |
| G06F 16/22 | (2019.01) | |

(52) U.S. Cl.
CPC .... *G06F 16/24568* (2019.01); *G06F 16/2219* (2019.01); *G06F 16/23* (2019.01); *G06F 16/252* (2019.01)

(58) Field of Classification Search
CPC ........ G06F 16/13; G06F 16/24; G06F 16/156; G06F 16/10; G06N 3/00; G06N 5/00; G05B 13/00
See application file for complete search history.

(56) References Cited

U.S. PATENT DOCUMENTS

| | | | |
|---|---|---|---|
| 5,913,912 | A | 6/1999 | Nishimura |
| 6,353,821 | B1 | 3/2002 | Gray |
| 7,774,336 | B2 | 8/2010 | Beyer |
| 7,849,227 | B2 | 12/2010 | Kashiyama |
| 8,286,191 | B2 | 10/2012 | Amini |

(Continued)

FOREIGN PATENT DOCUMENTS

| | | |
|---|---|---|
| WO | 2013078231 A1 | 5/2013 |
| WO | WO2016131413 A1 | 8/2016 |
| WO | WO2016111950 A1 | 7/2017 |

OTHER PUBLICATIONS

Childs et al., "A Contract Based System for Large Data Visualization", IEEE Visualization 2005.

(Continued)

*Primary Examiner* — Hung D Le
(74) *Attorney, Agent, or Firm* — Grant Johnson (57) ABSTRACT

A tuple manager of a database system processes partial tuples from a streaming application and stores them in a database. The partial tuples may include a large object (LOB) that arrives at the database at a different time than the rest of the corresponding tuple. A tuple manager stores partial tuples and uses a partial tuples index to track the partial tuples and coordinate recombination of corresponding partial tuples. The database allows queries to be run on the partial data before the tuples are reconstructed allowing faster access to potentially important data before the arrival and processing of a partial tuple such as an LOB.

18 Claims, 6 Drawing Sheets

(56) References Cited

U.S. PATENT DOCUMENTS

| | | | |
|---|---|---|---|
| 8,886,822 B2 | 11/2014 | Pedersen | |
| 8,959,313 B2 | 2/2015 | Santosuosso | |
| 8,990,416 B2 | 3/2015 | Shukla | |
| 9,286,352 B2 | 3/2016 | Park | |
| 9,325,742 B1 | 4/2016 | Barsness | |
| 9,563,486 B1 | 2/2017 | Narsude | |
| 9,659,063 B2 | 5/2017 | Cammert | |
| 9,805,095 B2 | 10/2017 | Deshmukh | |
| 9,836,467 B1 | 12/2017 | Barsness | |
| 9,996,561 B1* | 6/2018 | Barsness | G06F 16/21 |
| 10,025,826 B2 | 7/2018 | Barsness | |
| 10,127,283 B2 | 11/2018 | Barsness | |
| 10,515,080 B2 | 12/2019 | Barsness | |
| 10,691,489 B2 | 6/2020 | Barsness | |
| 10,885,050 B2 | 1/2021 | Barsness | |
| 2004/0268244 A1 | 12/2004 | Levanoni | |
| 2005/0192961 A1* | 9/2005 | Dittrich | G06F 16/284 |
| 2006/0064579 A1 | 3/2006 | Aaron | |
| 2006/0230029 A1 | 10/2006 | Yan | |
| 2007/0006173 A1 | 1/2007 | Sohm | |
| 2007/0112866 A1 | 5/2007 | Olson-Williams | |
| 2007/0136254 A1 | 6/2007 | Choi | |
| 2009/0150396 A1 | 6/2009 | Elisha | |
| 2009/0171999 A1 | 7/2009 | McColl et al. | |
| 2010/0211572 A1* | 8/2010 | Beyer | G06F 16/951 707/742 |
| 2010/0293301 A1 | 11/2010 | Amini | |
| 2010/0312801 A1 | 12/2010 | Ostrovsky et al. | |
| 2011/0010690 A1 | 1/2011 | Howard et al. | |
| 2011/0064079 A1 | 3/2011 | Lim | |
| 2011/0213802 A1 | 9/2011 | Singh et al. | |
| 2011/0239048 A1 | 9/2011 | Andrade | |
| 2012/0106366 A1* | 5/2012 | Gauvin | H04L 63/04 370/252 |
| 2012/0179809 A1 | 7/2012 | Barsness | |
| 2013/0091123 A1 | 4/2013 | Chen | |
| 2013/0111038 A1 | 5/2013 | Girard | |
| 2013/0212066 A1 | 8/2013 | Dehn | |
| 2013/0239100 A1 | 9/2013 | Andrade | |
| 2014/0040915 A1* | 2/2014 | Chen | G06F 9/4881 718/107 |
| 2014/0095462 A1 | 4/2014 | Park | |
| 2014/0095473 A1 | 4/2014 | Srinivasan | |
| 2014/0201211 A1* | 7/2014 | Holstege | G06F 16/334 707/741 |
| 2015/0142952 A1 | 5/2015 | Bragstad | |
| 2015/0227415 A1 | 8/2015 | Alves | |
| 2016/0042039 A1* | 2/2016 | Kaufmann | G06F 16/2456 707/722 |
| 2016/0102367 A1* | 4/2016 | Ferrando | A61K 31/506 514/252.19 |
| 2016/0342658 A1 | 11/2016 | Skrzypczak | |
| 2017/0004153 A1 | 1/2017 | Carter et al. | |
| 2017/0116050 A1 | 4/2017 | Thukkaram | |
| 2017/0116210 A1 | 4/2017 | Park | |
| 2017/0116283 A1 | 4/2017 | Park | |
| 2018/0246936 A1 | 8/2018 | Srinivasan | |
| 2019/0102431 A1 | 4/2019 | Bishnoi | |
| 2020/0249990 A1 | 8/2020 | Barsness | |

OTHER PUBLICATIONS

Anonymous, "PipelineDB Documentation", (Archived screen shots of multiple pages published on World Wide Web at http://docs.pipelinedb.com, available from //https://web.archive.org/web/*/docs.pipelinedb.com, archived on Aug. 25, 2016, original publication date unknown).

Anonymous, "Streaming Events from PostgreSQL Clients", (Archived screen shots of multiple pages published on World Wide Web at http://pipelinedb.com/examples, available from https://web.archive.org/web/*/www.pipelinedb.com/examples, archived on Dec. 21, 2015, original publication date unknown).

Anonymous, "The Streaming SQL Database", (Archived screen shot of page published on World Wide Web at http://www.pipelinedb.com, available from https://web.archive.org/web/*/www.pipelinedb.com, archived on Oct. 13, 2016, original publication date unknown).

Avnur et al., "Eddies: Continuously Adaptive Query Processing", ACM SIGMOD Record vol. 29, No. 2, ACM, 2000.

Babu et al., "Adaptive Ordering of Pipelined Stream Filters", ACM Sigmod 2004 Jun. 13-18, 2004, Paris, France.

Beth Plale et al., Dynamic Querying of Streaming Data with the dQUOB System, IEEE Transactions On Parallel and Distributed Systems, vol. 14, No. 4, pp. 422-426 (Apr. 2003).

Deshpande et al., "Adaptive Query Processing", Foundations and Trends in Databases, vol. 1, No. 1 (2007), pp. 1-140.

Gabriela Jacques-Silva et al., "Consistent Regions Guaranteed Tuple Processing in IBM Streams", Proceedings of the VLDB Endowment, vol. 9, No. 13, pp. 1341-1342 (2016).

Golab et al., "Issues in Data Stream Management", ACM SIGMOD Record, vol. 32, No. 2, Jun. 2003.

Jaedicke, Michael. "New Concepts for Parallel Object-Relational Query Processing." Lecture Notes in Computer Science (2001), https://link.springer.com/book/10.1007%2F3-540-45507-8.

Laxman et al., "Stream Prediction Using a Generative Model Based On Frequent Episodes in Event Sequences", KDD '08, Las Vegas, Nevada, USA, Aug. 27, 2008, ACM 978-1-60558-193-Apr. 8, 08, pp. 453-461.

Qiong Zou et al., "From a Stream of Relational Queries to Distributed Stream Processing", Proceedings fo the VLDB Endowment, vol. 3, No. 2, 2010, pp. 1394-1405 (Sep. 2010).

Sotiropoulos, et al., "LinkViews: An Integration Framework for Relational and Stream Systems", In BIRTE Workshop, Int. Conf. on VLDB, published at http://birte2013.cs.aau.dk/files/Sotiropoulos.pdf (Sep. 2013).

Splunk, Inc., "Splunk DB Connect Fact Sheet", published on World Wide Web at https://www.splunk.com/web_assets/pdfs/secure/Splunk_for_DB_Connect.pdf, available from https://web.archive.org/web/*/https://www.splunk.com/web_assets/pdrs/secure/Splunk_for_DB_Connect.pdf (archived on Sep. 24, 2015, original publication date unknown).

Tian et al., "Tuple Routing Strategies for Distributed Eddies", Proceedings of the 29th International Conference on Very Large Databases, vol. 29, Berlin, Germany, VLDB Endowment, 2003.

* cited by examiner

STORING PARTIAL TUPLES FROM A STREAMING APPLICATION IN A DATABASE SYSTEM

BACKGROUND

1. Technical Field

This disclosure generally relates to computer processing, and more specifically relates to a system and method for processing and storing partial data tuples from a streaming application in a database system.

2. Background Art

Streaming applications are becoming more common due to the high performance that can be achieved from near real-time processing of streaming data. A streaming application is organized as a data flow graph consisting of multiple operators connected via stream connections that each process streaming data in near real-time. An operator typically takes in streaming data in the form of data tuples, operates on the tuples in some fashion, and outputs the processed tuples to the next operator in the flow graph.

Some stream applications may have many operators processing a stream and making and decisions about the data. The data of a stream in many business analytic processes may ultimately end up in a relational database. These business stream applications may have tuples which include large objects (LOBs). The LOBs can contain text documents, images, or movies and can be stored directly in a database system with sizes up to 2 gigabytes per object and possibly larger for other database systems. Taking the tuples with the LOBs through all the streams operators in the flow may severely diminish performance.

BRIEF SUMMARY

A tuple manager of a database system processes partial tuples from a streaming application and stores them in a database. The partial tuples may include a large object (LOB) that arrives at the database at a different time than the rest of the corresponding tuple. A tuple manager stores partial tuples and uses a partial tuples index to track the partial tuples and coordinate recombination of corresponding partial tuples. The database allows queries to be run on the partial data before the tuples are reconstructed allowing faster access to potentially important data before the arrival and processing of a partial tuple such as an LOB.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein relate to a system and method for processing partial tuples from a streaming application and storing them in a database. The partial tuples may include a large object (LOB) that arrives at the database at a different time than the rest of the corresponding tuple. A tuple manager stores partial tuples and uses a partial tuples index to track the partial tuples and coordinate recombination of corresponding partial tuples. The database allows queries to be run on the partial data before the tuples are reconstructed allowing faster access to potentially important data before the arrival and processing of a partial tuple such as an LOB.

Figure 1:
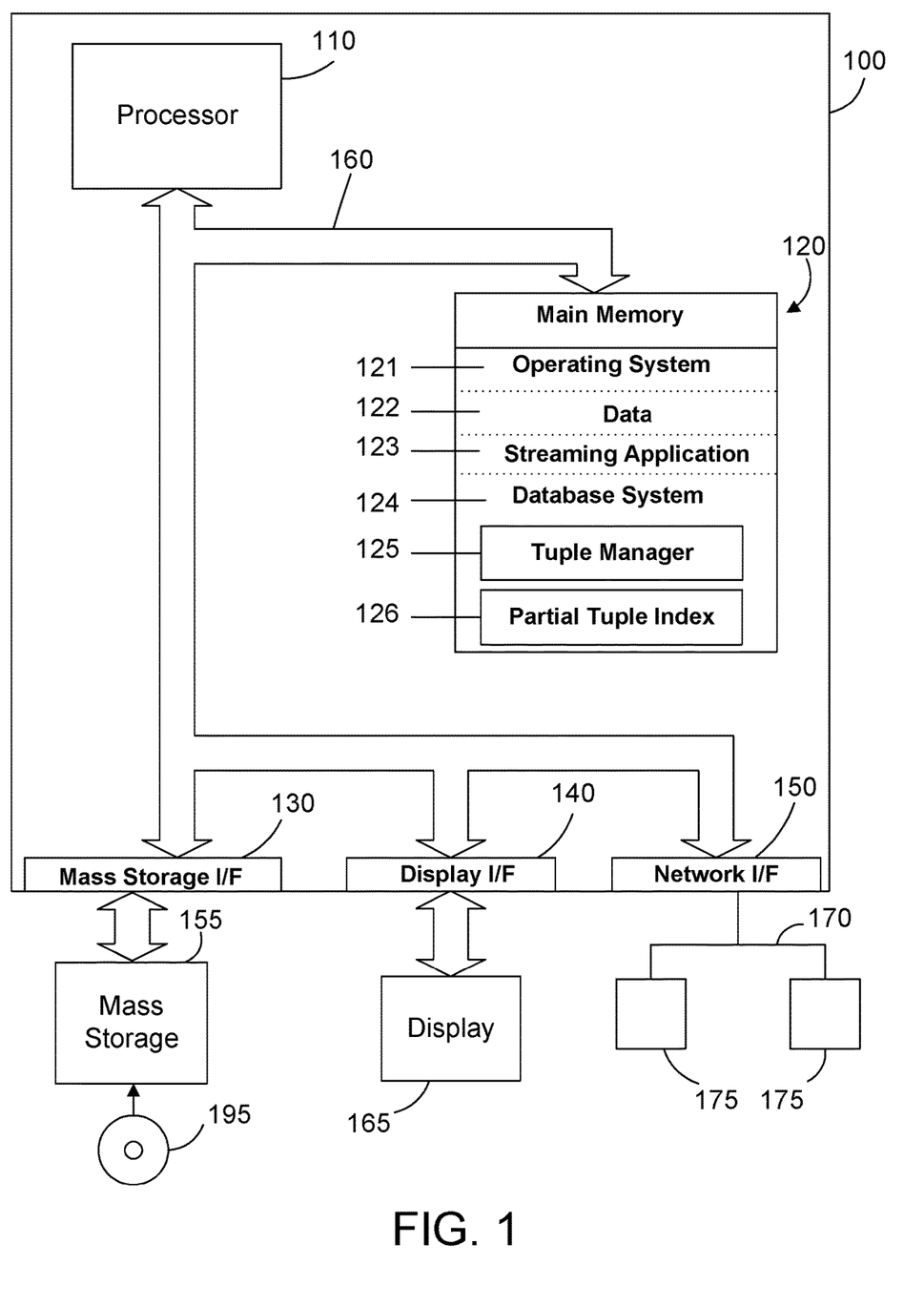
FIG. 1 is a block diagram a computer system with a tuple manager that processes partial tuples from a streaming application and stores them in a database.

Referring to FIG. 1, a computer system 100 is one suitable implementation of a computer system that is capable of performing the computer operations described herein including for processing partial tuples from a streaming application and storing them in a database as described herein. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as mass storage 155, to computer system 100. One specific type of mass storage 155 is a readable and writable CD-RW drive, which may store data to and read data from a CD-RW 195. Some mass storage devices may have a removable memory card or similar instead of the CD-RW drive.

Main memory 120 preferably contains an operating system 121 and data 122. Operating system 121 may be a multitasking operating system known in the industry as IBM i; however, those skilled in the art will appreciate that the spirit and scope of this disclosure is not limited to any one operating system. Data 122 may include any data stored or used in computer system 100 The memory 120 further includes one or more streaming applications 123. The memory 120 also includes a database system 124 that includes a tuple manager 125 and a partial tuple index 126. The tuple manager 125 processes partial tuples from a streaming application and stores them in a database using the partial tuple index 126 as described further below.

Computer system 100 utilizes well known virtual addressing mechanisms that allow the programs of computer system 100 to behave as if they only have access to a large, single storage entity instead of access to multiple, smaller storage entities such as main memory 120 and mass storage 155. Therefore, while operating system 121, data 122, streaming application 123, database system 124, the tuple manager 125 and the partial tuple index 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the applications 123 as directed by a user and the streams manager 124.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term streaming application means an application or program that processes data that may be provided to the application in a continuous data stream. The streaming application processes input data in the form of tuples. A tuple is an individual piece of data in the data stream. Typically, the data in a tuple represents the state of something at a specific point in time. For example, the tuple may represent a stock ticker quote, a patient record, or a temperature reading from an individual sensor. The data stream is thus a running sequence of tuples. Multiple streams and operators that are deployed can be represented in a dataflow graph. When a streams application is compiled, the operators and streams relationships that make up the data flow graph are broken down into one or more individual execution units that are known as processing elements. A processing element may be further broken down into operators. As used herein an operator is any basic functional block that acts on data (tuples) in flight. Thus, an operator is a portion of an application processing element or a streaming application that manipulates the tuple data from the incoming stream and produces the results in the form of an output stream.

Figure 2:
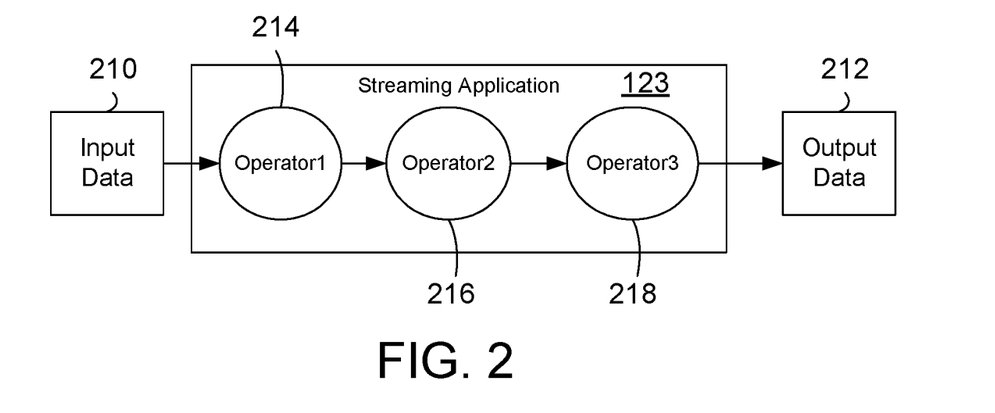
FIG. 2 illustrates a simplified block diagram of data flow in a streaming application.

FIG. 2 illustrates a block diagram of data flow in a streaming application 123. The streaming application 123 receives input data 210 and outputs output data 212. The streaming application 123 is deployed to one or more nodes in a computer system such as a cluster computer or cloud. In this simplified example, the streaming application 123 has three operators, namely operator1 214, operator2 216, and operator3 218. Operator1 214 receives input data 210 and originates a stream of tuples, which is processed by operator2 216. The tuples output from operator2 216 are processed by operator3 218, which outputs output data 212.

Figure 3:
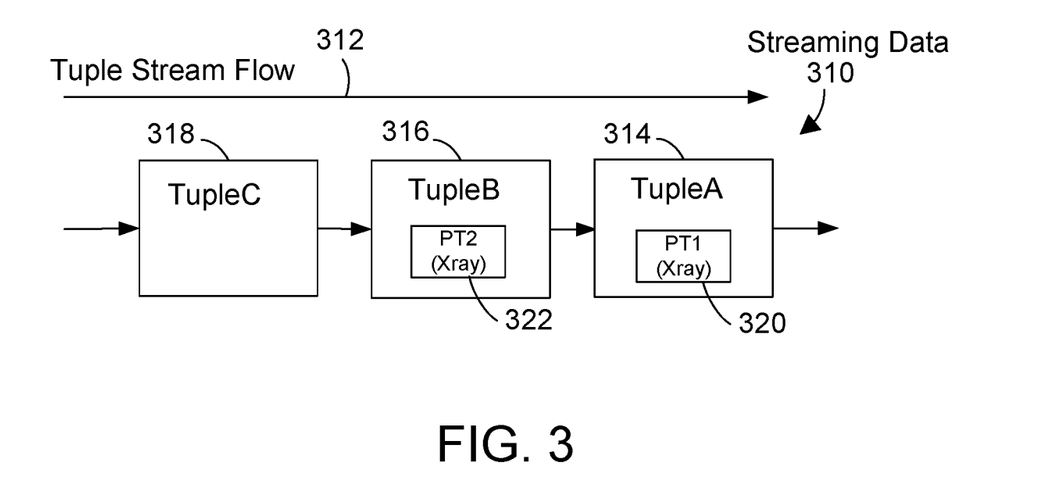
FIG. 3 illustrates a simplified block diagram of an example of streaming data that is processed by a streaming application.

FIG. 3 illustrates a simplified example of streaming data 310 that may be processed by a streaming application. In this example, the streaming data 310 includes a stream of tuples flowing in the direction indicated by the arrow 312. The streaming data 310 includes tupleA 314 as the first tuple in the streaming data 310 followed by tupleB 316 and tupleC 318. Thus, if the streaming data 310 were input into the streaming application 123 in FIG. 2, tupleA 314 would be the first tuple to be supplied to the streaming application as input data 210. As introduced above, a data tuple is an individual piece of data in the data stream. While a tuple may be considered as an individual piece or chunk of data, the tuple may be divided into partial tuples as discussed herein. For example, a tuple may include a large object (LOB) as known in the prior art. An LOB divided out of a tuple can also be considered a partial tuple as well as the remaining portion of the tuple after removing the LOB. LOBs that are part of a tuple and referred herein as partial tuples could include files, documents, videos or images such as x-rays. In the example shown in FIG. 3, tupleA 314 includes partial-tuple1 320 and tupleB 316 includes partial-tuple2 322. As used in the following examples, partial-tuple1 320 is an x-ray image of a first patient and partial-tuple2 322 is an x-ray image of another patient in a patient data base system as described further below. When the large objects, in this case the x-rays, are removed from the tuples the remaining tuple becomes a partial tuple as described below.

Figure 4A:
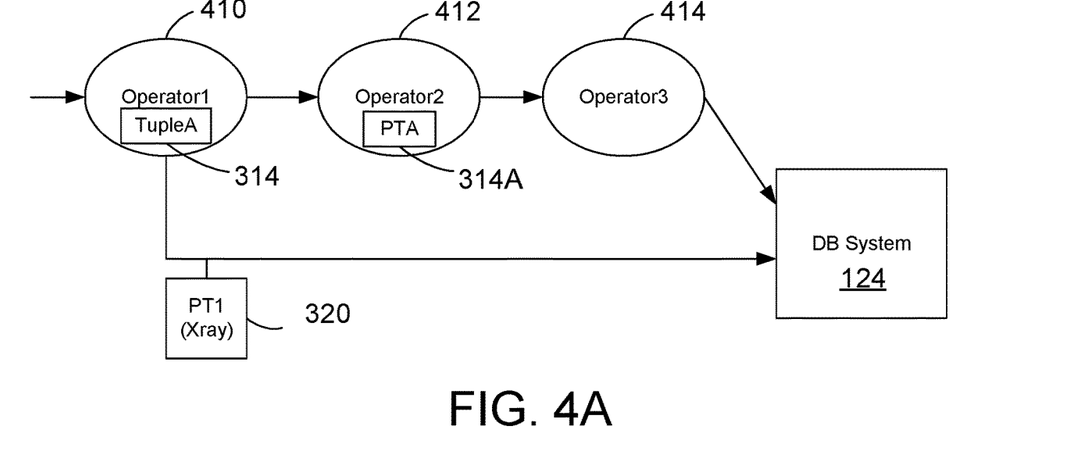
FIGS. 4A and 4B illustrate examples of a streaming application that separates out partial tuples and passes them to a database system.
Figure 4B:
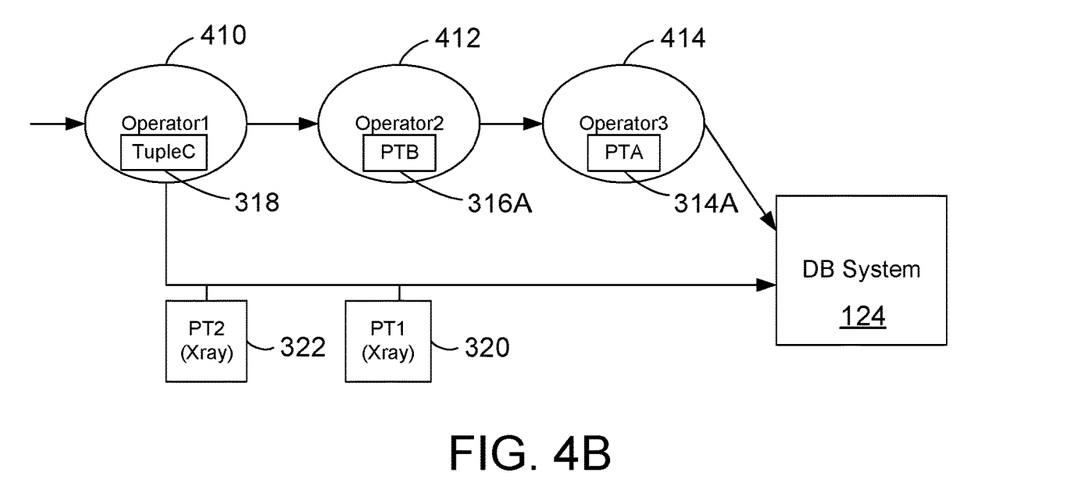

FIGS. 4A and 4B illustrate an example of operators of a streaming application that separate out partial tuples and pass them to a database system. In this example, the operators 410, 412, 414 represent operators of an application (not shown) that process patient data records and store the processed records in the database system 124. Further, in this example we assume the streaming data 310 in FIG. 3 is applied to the operators 410, 412, 414. Thus operator1 410 initially begins processes tupleA 314. FIG. 4A shows a snapshot in time where operator1 410 is currently processing tupleA 314. Operator1 410 is configured to recognize that tupleA 314 includes a large object, which in this case is an image of a patient x-ray. Operator1 410 then separates the large object from tupleA 314 as a partial tuple1 320 and begins to pass the partial tuple to the database system 124. Operator1 410 finishes processing tupleA 314 by sending the partial tupleA 314A without the LOB to the next operator in the stream, which in this case is operator2 412. Operator2 412 operates on partial tupleA 314A received from operator1 410 and sends the results to operator3 414. Operator3 414 then passes the partial tupleA 314A without the LOB to the database system 124. Typically the partial tupleA 314A without the LOB will arrive at the database system 124 before the partial tuple 320.

FIG. 4B continues the example of FIG. 4A. FIG. 4B shows a later snapshot in time where operator1 410 is processing tupleC 318. Just previous to the time shown in FIG. 4B, operator1 410 processed tupleB. TupleB included an image of another patient x-ray as a large object. Similar to above, operator1 410 recognized that tupleB included the large object, then removed the large object from tupleB resulting in partial tupleB 316A and partial tuple2 322. Operator1 410 then began to pass partial tuple2 322 to the database system 124 and passed partial tupleB 316A to operator2 412. At the time shown in FIG. 4B, the large objects 320 and 322 are being sent to the database system 124, operator2 412 is processing partial tupleB 316A and operator3 414 is processing partial tupleA 314A. The database system stores the partial tuples, the LOB and the tuple data remaining after the separation of the LOB, in the database using a partial tuple index to track and coordinate recombination of the tuples as described further below.

Figure 5:
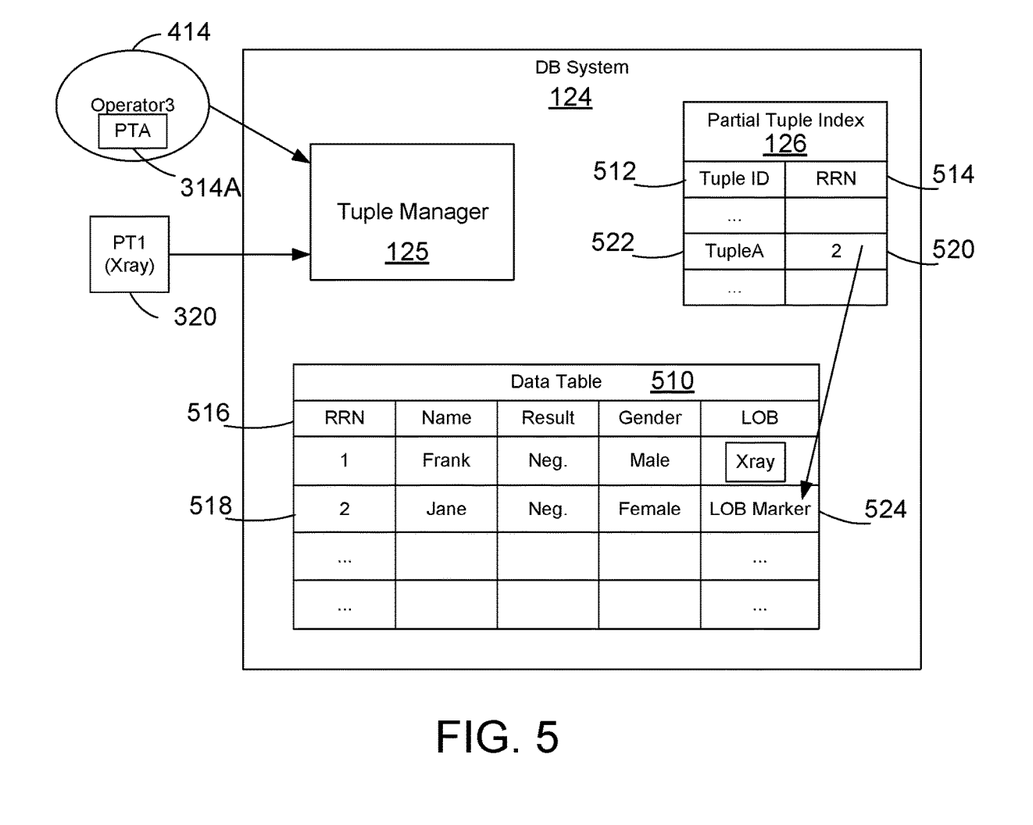
FIG. 5 is block diagram of a database system that processes partial tuples from a streaming application and stores them using a partial tuple index to coordinate recombination of the tuples.

FIG. 5 is block diagram showing one possible implementation of the database system 124 in FIG. 1. The database system processes partial tuples from a streaming application and stores them in the database 124 using a partial tuple index 126. In this example, the database system 124 includes a tuple manager 125 that processes partial tuples for storage and recombination using the partial tuple index 126. The tuple manager uses the partial tuple index 126 to track the location of corresponding partial tuples in a data table 510. In the example of FIG. 5, the partial tuple index 126 is an index that includes a tuple identifier 512 and a corresponding relative record number (RRN) 514. The RRN 514 indicates where a corresponding partial tuple is stored in the data table 510 for a tuple identified by the tuple identifier 512. The data table 510 may be any suitable table for holding the contents of tuple data including the partial tuple data from operators that split the tuple data as described above. In this example, the data table 510 includes patient records with patient data including x-rays. The columns 516 of the patient data include a relative record number (RRN), name, result of the x-ray, gender of the patient and an x-ray image as a large object.

Referring again to FIG. 5, we will now consider an example of processing partial tuples from a streaming application and storing them in the database using a partial tuple index. This example continues from the example of tuples processing streaming data to separate out partial tuples in FIGS. 4A and 4B. In FIG. 5, the tuple manager 125 is shown receiving partial tupleA 314A from operator3 414. The tuple manager 125 processes partial tupleA 314A and recognizes partial tupleA 314A is a partial tuple since it is missing a large object. The tuple manager could determine that the arriving tuple is a partial tuple, for example, by finding an empty field in the tuple data structure. The tuple manager 125 determines whether there is a matching tuple in the partial tuple index 126 by checking for a record with the same tuple ID. Since there is no matching tuple in this case, the tuple manager 125 stores data from the partial tupleA 314A to the data table 510 at the next available location 518. The tuple manager 125 then updates the partial table index 126 with a relative record number 520 where the partial tuple was stored in the database table 510. In this case the RRN is 2. The relative record number 520 thus points to where there is a missing LOB in the record 518 of the data table 510. A marker 524 may be placed in the record as a placeholder to indicate the LOB has not been received.

Later, when the LOB 320 arrives at the tuple manager 125, the tuple manager 125 will determine that a matching tuple exists in the index for this tuple ID 522 by comparing the incoming tuple ID with tuple IDs in the partial tuple index. Finding a match, the tuple manager 125 will write the partial tuple LOB 320 to the database table 510 at row 2 indicated by the RRN of 2 520 in the partial tuple index 126. When all relevant tuple information has been received from the partial tuple(s) and the tuple is complete, the tuple manager may then delete the entry (520, 522) in the partial tuple index for tupleA 314 since it is no longer waiting for a partial tuple with the tuple ID of tupleA 522. The tuple ID could be any appropriate identifier such as the patient name or a tuple identifier number.

In the above example shown in FIG. 5, it was assumed that the partial tuple1 320 with the LOB arrived after the partial tupleA 314A. This is typically the case where the LOB is very large such as an x-ray. However, it is possible that the LOB, partial tuple1 320, could arrive first due to other circumstances such as a problem with one of the downstream operators. In this case, the tuple manager 125 will behave essentially the same. Instead of storing the partial tuple that originated from the stream operators and then waiting for the partial tuple with the LOB, the tuple manager 125 would store the partial tuple with the LOB and leave the rest of the record in the data table empty (or populate the rest of the record with a marker, such as "NULL") for the partial tuple ID until the arrival of the matching partial tuple with the remaining patient data. Thus, the flow remains the same but a different partial tuple with a different portion of the tuple data is first stored while waiting for the second partial tuple with the remainder of the tuple data.

The above examples focus on the partial tuple as having a large object. Separating out the large object may be advantageous for several reasons. For example, separating out a large object may increase the efficiency of the other operators that can now process much smaller tuples where the large objects are not needed by these operators. There also may be examples of the present invention where the partial tuple that is separated out is not necessarily a large object. In another example, the partial tuple separated out may be security sensitive data that is separated out and sent directly to the database system so that the security sensitive data is not processed through the remaining operators. This might be advantageous where the other operators are located at a less secure facility or other security reasons. In this example, the partial tuple with the security sensitive data may arrive at the database before the remaining portions of the tuple arrives at the database. Alternatively, the tuples may be separated for performance reasons. For example, the tuples may be separated so that important or urgent data is send to the database first and other data sent later.

In the above examples, the operator separated the tuple into two partial tuples. In some situations it may be advantageous to separate a single tuple into three or more partial tuples. The operator could then send the multiple partial tuples separately to other tuples down-stream in the streaming application or directly to the tuple manager in the database system. The tuple manager can assemble all the partial tuples using the partial tuple index as described above.

Figure 6:
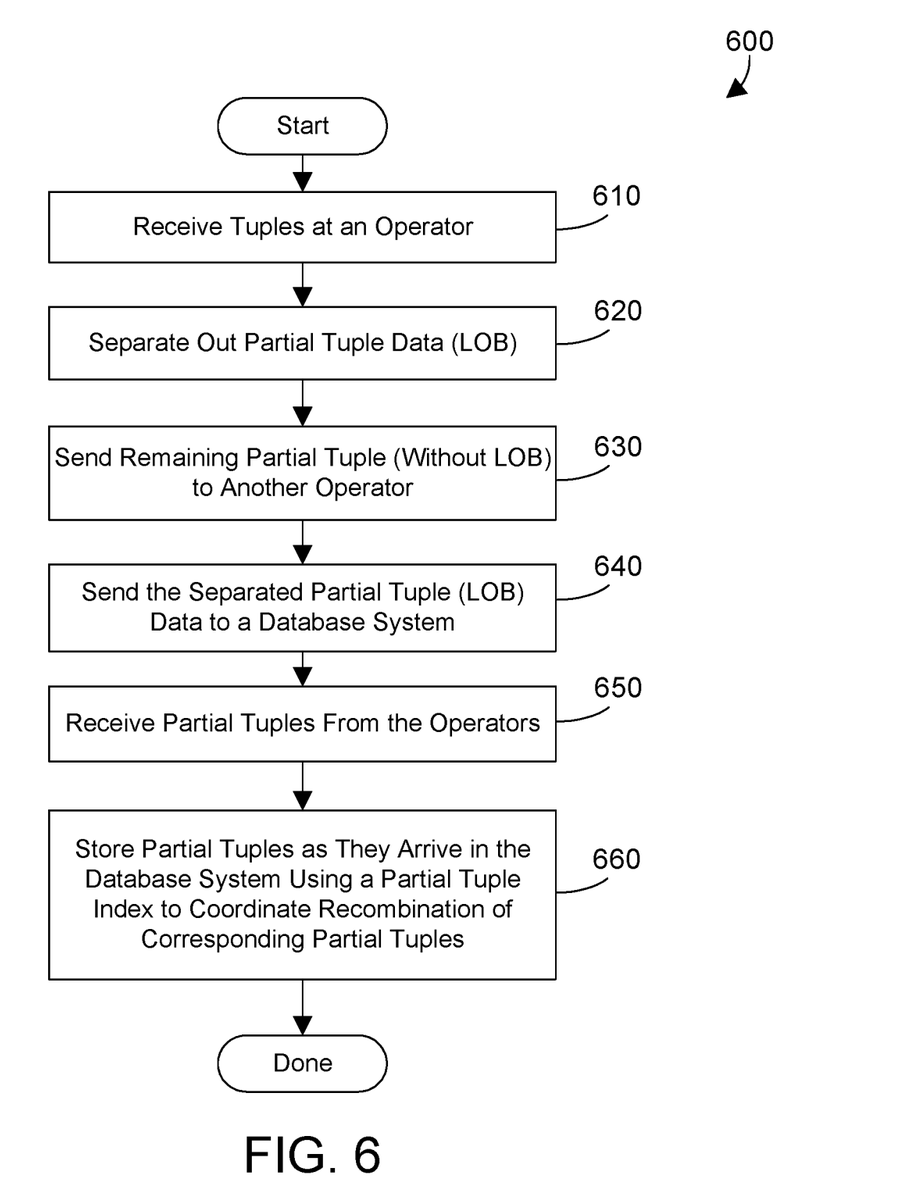
FIG. 6 is flow diagram of an example method of processing partial tuples from a streaming application and storing them in a database.

Referring to FIG. 6, a method 600 shows one suitable example for processing partial tuples from a streaming application and storing them in a database. Portions of method 600 are preferably performed by operators of the streaming application 123 and the tuple manager 125 shown in FIG. 1. First, receive tuples at an operator (step 610). Next, separate out partial tuple data such as large objects (step 620) and send the remaining partial tuple without the LOB to another operator in the streaming application (step 630). Send the partial tuple data (LOB) to the database system (step 640). Receive partial tuples from the operators (step 650). Store the partial tuples in the database as they arrive using a partial tuple index to coordinate recombination of the corresponding partial tuples (step 660). Method 600 is then done.

Figure 7:
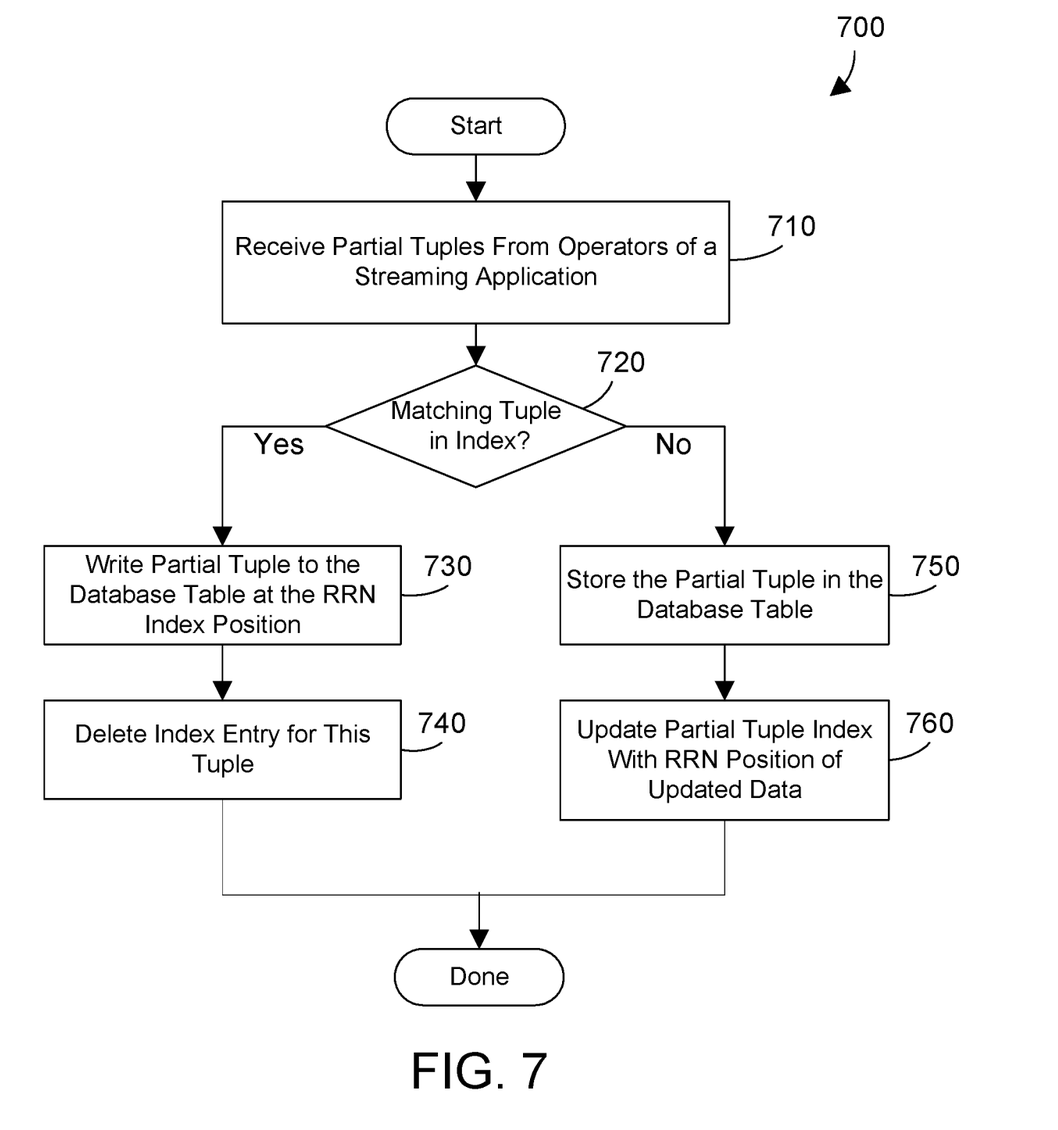
FIG. 7 is a flow diagram of an example method of storing partial tuples in the database using a partial tuple index in step 660 of FIG. 6.

FIG. 7 shows a suitable method 700 for storing the partial tuples in the database as they arrive using a partial tuple index to track and coordinate recombination of the tuples. Method 700 thus shows one method for performing step 660 in method 600 shown in FIG. 6. Method 700 may be performed by the tuple manager 124 shown in FIG. 1. Receive partial tuples from operators of a streaming application (step 710). Determine if a partial tuple has a matching tuple in the partial tuple index (step 720). If there is a matching tuple in the index (step 720=yes), then write the partial tuple to the database table at the relative record number (RRN) index position (step 730). Then delete the index entry for this tuple (step 740). If there is no matching tuple in the index (step 720=no), then store the partial tuple in the database table (step 750). Then update the partial table index to include a record for the tuple ID of the stored tuple and the RRN of the partial tuple as stored in the data table (step 760). The method 700 is then done.

The claims and disclosure herein support an apparatus comprising: at least one processor; a memory coupled to the at least one processor; and a tuple manager residing in the memory and executed by the at least one processor that receives partial tuples from a first and second operator of a streaming application, wherein the tuple manager stores the partial tuples in a database system using a partial tuple index to coordinate recombination of corresponding partial tuples.

The claims and disclosure herein further support a computer-implemented method executed by at least one processor for processing and storing partial data tuples from a streaming application in a database system comprising: receiving partial tuples from a first operator and a second operator of the streaming application; and storing the partial tuples in the database system using a partial tuple index to coordinate recombination of corresponding partial tuples.

The claims and disclosure herein additionally support a computer-implemented method executed by at least one processor for processing and storing partial data tuples from a streaming application in a database system comprising: receiving partial tuples from a first operator and a second operator of the streaming application; and storing the partial tuples in the database system using a partial tuple index to coordinate recombination of corresponding partial tuples by: receiving a first partial tuple from one of the first or second operators; determining whether the first partial tuple has a matching tuple in an entry of the partial tuple index; where there is no matching tuple, storing the first partial tuple in a data table and updating the partial tuple index to include a new entry with a tuple identification and a relative record number where the partial tuple was stored in the data table; receiving a second partial tuples from one of the first or second operators; determining whether the second tuple has a matching tuple in an entry of the partial tuple index; and where there is a matching tuple the tuple manager, writing the second partial tuple to the data table in the database system using a relative record number from the partial tuple index of the matching first partial tuple and deleting the entry; and receiving incoming tuples by the first operator, separating out partial tuple data from an incoming tuple, sending the separated out partial tuple data to the database system, and sending the remaining partial tuple to the second operator.

A tuple manager of a database system processes partial tuples from a streaming application and stores them in a database. The partial tuples may include a large object (LOB) that arrives at the database at a different time than the rest of the corresponding tuple. A tuple manager stores partial tuples and uses a partial tuples index to track the partial tuples and coordinate recombination of corresponding partial tuples. The database allows queries to be run on the partial data before the tuples are reconstructed allowing faster access to potentially important data before the arrival and processing of a partial tuple such as an LOB.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
    at least one processor;
    a memory coupled to the at least one processor; and
    a tuple manager residing in the memory and executed by the at least one processor that receives partial tuples from at least one operator of a streaming application, wherein the tuple manager stores the partial tuples in a database using a partial tuple index to coordinate recombination of corresponding partial tuples; wherein:
        the tuple manager receives a first partial tuple from the at least one operator and determines whether the first partial tuple has a matching tuple in an entry of a partial tuple index, and when there is no matching tuple the tuple manager stores the first partial tuple in a data table in the database and updates the partial tuple index to include a new entry with a tuple identification and a relative record number where the first partial tuple was stored in the data table.

2. The apparatus of claim 1, wherein the tuple manager receives a second partial tuple from the at least one operator and determines whether the second partial tuple has a matching tuple in an entry of the partial tuple index, and when there is a matching tuple the tuple manager writes the second partial tuple to the data table in the database system using the relative record number from the partial tuple index of the matching first partial tuple and deletes the entry when all relevant tuple information has been received.

3. The apparatus of claim 2 wherein a first operator of the streaming application receives incoming tuples, separates out a partial tuple from an incoming tuple, sends the separated out partial tuple data to the database system as the first partial tuple, and sends remaining data from the incoming tuple as the second partial tuple to another operator.

4. The apparatus of claim 3 wherein the separated out partial tuple is a large object.

5. The apparatus of claim 3 wherein the separated out partial tuple is separated out for security reasons and sent directly to the database.

6. The apparatus of claim 3 wherein the separated out partial tuple is separated out for performance reasons and sent directly to the database.

7. The apparatus of claim 1 wherein the tuple index includes a tuple identifier and a relative record number that points to a location in the data table where a corresponding partial tuple was previously stored.

8. The apparatus of claim 1 wherein the data table includes a marker in a column of the table in place of a missing partial object.

9. A computer-implemented method executed by at least one processor for processing and storing partial data tuples from a streaming application in a database system comprising:
   receiving partial tuples from at least one operator of the streaming application; and
   storing the partial tuples in the database system using a partial tuple index to coordinate recombination of corresponding partial tuples, wherein storing partial tuples in the database system comprises:
      receiving a first partial tuple from the at least one operator;
      determining whether the first partial tuple has a matching tuple in an entry of the partial tuple index; and
      where there is no matching tuple, storing the first partial tuple in a data table and updating the partial tuple index to include a new entry with a tuple identification and a relative record number where the partial tuple was stored in the data table.

10. The method of claim 9 wherein storing partial tuples in the database system further comprises:
   receiving a second partial tuples from the at least one operator;
   determining whether the second tuple has a matching tuple in an entry of the partial tuple index; and
   where there is a matching tuple the tuple manager, writing the second partial tuple to the data table in the database system using a relative record number from the partial tuple index of the matching first partial tuple and deleting the entry when all relevant tuple information has been received.

11. The method of claim 10 further comprising receiving incoming tuples by a first operator of the at least one operator, separating out partial tuple data from an incoming tuple, sending the separated out partial tuple data to the database system, and sending the remaining partial tuple to a second operator of the at least one operator.

12. The method of claim 11 wherein the separated out partial tuple is a large object.

13. The method of claim 12 wherein the large object is an image file.

14. The method of claim 11 wherein the separated out partial tuple is separated out for security reasons and sent directly to the database.

15. The method of claim 9 wherein the tuple index includes a tuple identifier and a relative record number that points to a location in the data table where a corresponding partial tuple was previously stored.

16. A computer-implemented method executed by at least one processor for processing and storing partial data tuples from a streaming application in a database system comprising:
   receiving partial tuples from a first operator and a second operator of the streaming application; and
   storing the partial tuples in the database system using a partial tuple index to coordinate recombination of corresponding partial tuples by:
      receiving a first partial tuple from one of the first or second operators;
      determining whether the first partial tuple has a matching tuple in an entry of the partial tuple index; where there is no matching tuple, storing the first partial tuple in a data table and updating the partial tuple index to include a new entry with a tuple identification and a relative record number where the partial tuple was stored in the data table;
      receiving a second partial tuples from one of the first or second operators;
      determining whether the second tuple has a matching tuple in an entry of the partial tuple index; and where there is a matching tuple the tuple manager, writing the second partial tuple to the data table in the database system using a relative record number from the partial tuple index of the matching first partial tuple and deleting the entry when all relevant tuple information has been received; and
   receiving incoming tuples by the first operator, separating out partial tuple data from an incoming tuple, sending the separated out partial tuple data to the database system, and sending the remaining partial tuple to the second operator.

17. The method of claim 16 wherein the separated out partial tuple is a large object.

18. The method of claim 17 wherein the large object is an image file.

* * * * *